No. 814,292. PATENTED MAR. 6, 1906.
F. E. HUTCHINS.
INSTRUMENT FOR MEASURING ANGLES.
APPLICATION FILED FEB. 25, 1905.

3 SHEETS—SHEET 2.

Witnesses:
Edward C. Wilson
F. L. Pittman

Inventor:
Francis E. Hutchins

No. 814,292. PATENTED MAR. 6, 1906.
F. E. HUTCHINS.
INSTRUMENT FOR MEASURING ANGLES.
APPLICATION FILED FEB. 25, 1905.

3 SHEETS—SHEET 3.

Witnesses:
Edward C. Wilson
F. L. Pittman

Inventor:
Francis E. Hutchins

UNITED STATES PATENT OFFICE.

FRANCIS E. HUTCHINS, OF WARREN, OHIO.

INSTRUMENT FOR MEASURING ANGLES.

No. 814,292.　　　Specification of Letters Patent.　　Patented March 6, 1906.

Application filed February 25, 1905. Serial No. 247,390.

*To all whom it may concern:*

Be it known that I, FRANCIS E. HUTCHINS, a citizen of the United States of America, and a resident of Warren, in the county of Trumbull and State of Ohio, have made a certain new and useful Improvement in Instruments for Measuring Angles; and I declare the following to be a full, clear, and correct description of the same, such as will enable others skilled in the art to which it pertains to make and use the invention, reference being had to the accompanying drawings, and to letters and figures of reference marked thereon, which form a part of this specification.

My invention or device is designed chiefly for the ready, accurate, and certain measurement and plain and certain indication of vertical angles and for converting the ordinary engineer's transit into a readily-adjusted, accurate, and certain level, thus making that instrument, in addition to its ordinary uses as a transit, serve also all the purposes of a level and the ordinary purposes of a theodolite in measuring vertical angles, and is here described in its application to such transit, although the same principle, device, and invention may by slight differences in adjustment and detail be applied to astronomical and other instruments for measuring vertical angles, and the claims here made are not designed to interfere or be in conflict with any right secured by Letters Patent No. 751,647, issued to me February 9, 1904, but are designed to cover and protect my invention in its application to instruments for measuring vertical angles and for leveling.

Figure 1:
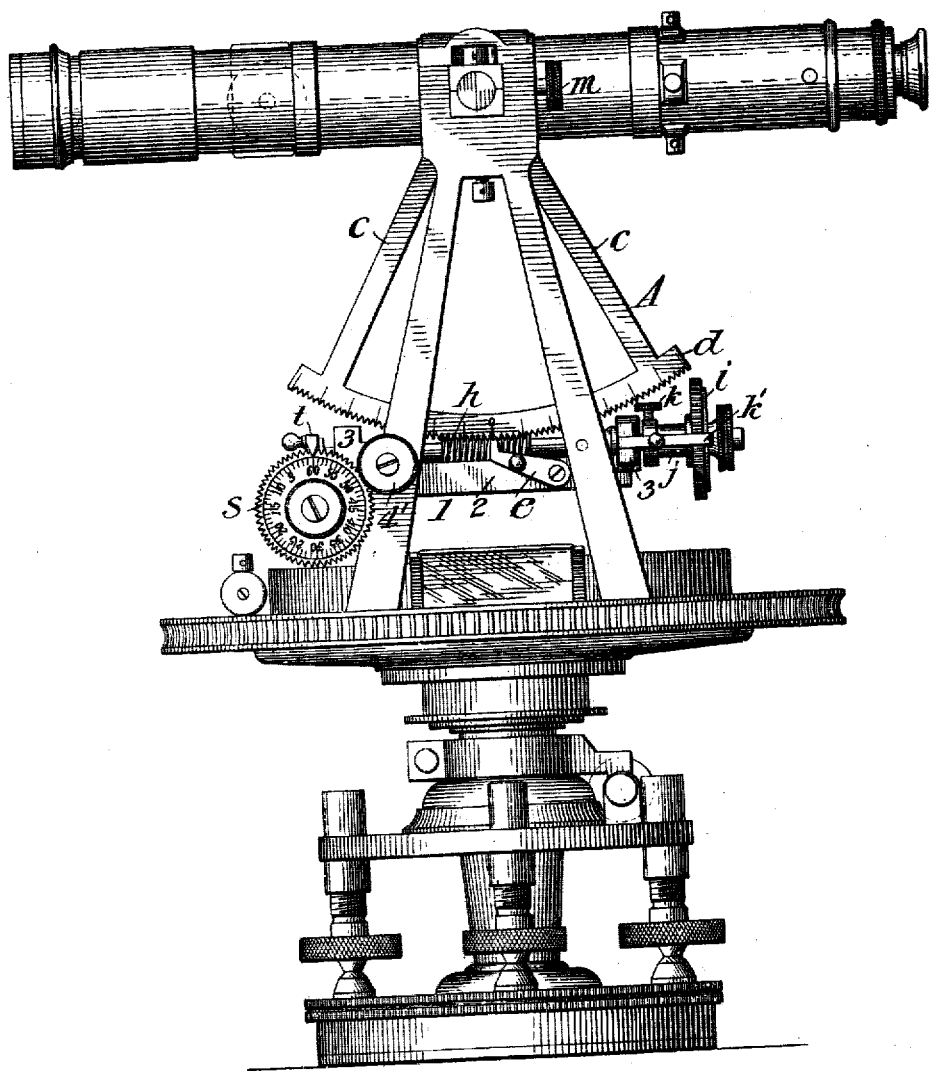
Figure 2:
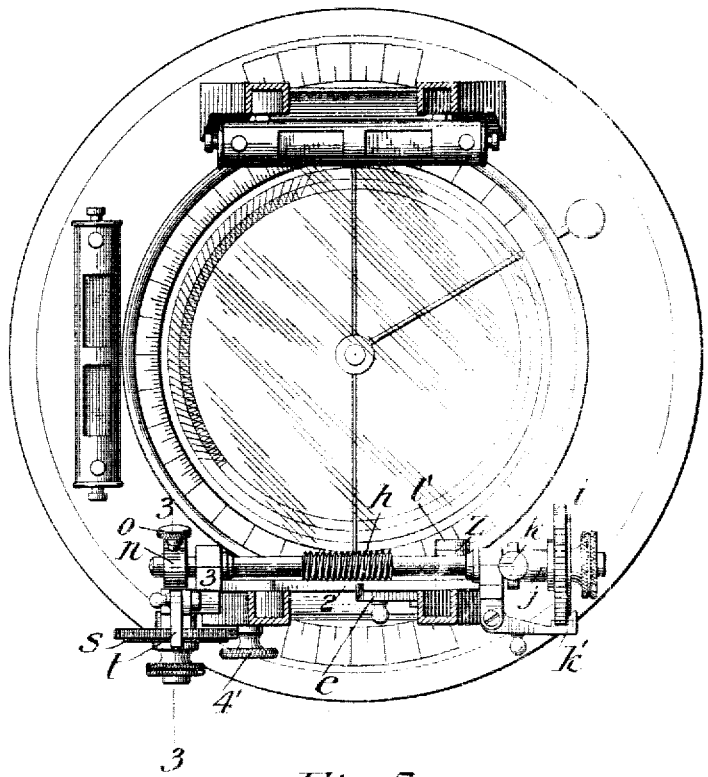
Figure 3:
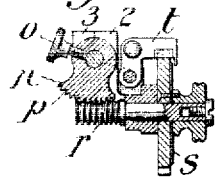
Figure 4:
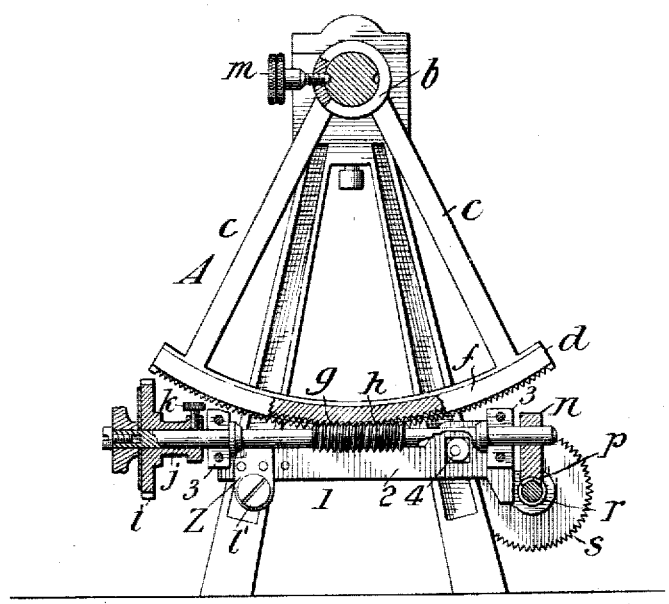
Figure 5:
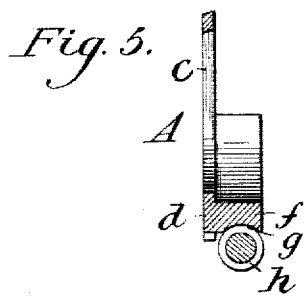

Figure 1 is a side elevation of my instrument. Fig. 2 is a top view, the telescope being omitted. Fig. 3 is a sectional view taken on line 3 3, Fig. 2. Fig. 4 is a vertical sectional view of part of the instrument, some of the parts being broken away. Fig. 5 is a fragmentary sectional view taken through the arc and the minutes-screw.

As applied to the engineer's transit my invention or device consists of the vertical degree-plate A, immediately inside of one of the standards supporting the telescopic axis and through the hub $b$ of which one end of such axis passes rotatably before entering such standard. Two spokes $c$ radiate from said hub, one to near each end of the arc $d$. The face of the arc $d$ is marked with degree-lines running each way from zero in the middle, and the periphery of the arc is cut with equal triangular grooves one degree apart. The movable degree-catch $e$ is so shaped and adjusted that when its movable end is raised a shaped portion thereof will enter and fill one of the grooves in the periphery of the arc, thus serving to fasten the arc, with its pointer, at zero or any degree-line and also to make it certain that the arc is exactly in that position. This degree-catch is so shaped as to serve also as a pointer, past which the arc as it turns will rotate its degree-lines for identification and is frictionally held in its elevated position. On the side opposite its face the thickness of this arc is increased by the lateral projection $f$, running along the length of the arc a little above its periphery and of a size suitable for the groove and threads next mentioned. The convex side of this projection $f$ is grooved and cut with threads to form part of the screw-gear $g$, mentioned later. The frame 1, consisting of its horizontal bar 2 and a lateral projection 3 at each end and through which passes rotatably the shaft of the minutes-screw, described later, serves as support and bearings for said minutes-screw and parts connected therewith. One end of this horizontal bar is pivoted to one leg of said standard, as at the point Z upon screw 1', and is so arranged that the shaft of said minutes-screw when in place, passing through said lateral projection 3, will be tangent to and immediately under the grooved and threaded portion $f$ of said arc and so that by raising or lowering the movable end of said frame the threads of the minutes-screw will engage or disengage those in that portion of the arc forming the screw-gear for the partial rotation of said arc by turning said minutes-screw. At the movable end of said frame an eccentric 4, working in a slot in said horizontal bar with its stem passing through the other leg of said standard, with a milled head, (shown as 4',) serves to raise or lower said frame and to thus engage or disengage the threads of said screw-gear at will. The minutes-screw $h$ aforesaid passes rotatably through the said lateral projections 3, with a small portion of the middle part of its shaft cut in threads corresponding with and to engage those before mentioned in the said arc. The threads in each of these parts are of degree-pitch and so that when engaged one revolution of the minutes-screw will move the arc just one degree. Near its head the shaft of this minutes-screw passes rotatably through a dial $i$, the face of which is graduated around and near its edge by sixty equidistant lines for minutes numbered by fives similar to the graduations shown upon the dial S and which as the dial revolves with the minutes-screw are passed immediately before a stationary pointer for identification. Before passing through said dial the said shaft passes rotatably through a sleeve $j$, fastened to the back of said dial. A dial-screw $k$, passing through one side of this sleeve with its end against said shaft, serves when tightened to fasten the dial to the shaft, so that the dial must turn with the minutes-screw and when loosened will permit that screw to turn while the dial remains stationary. The periphery of this dial or of the casing containing it is cut by sixty equidistant triangular grooves for minutes, and the dial-catch $k'$ is so shaped and adjusted that a portion of its shaped movable end may at will be made to enter and fill any one of said triangular grooves, thus at will fastening the dial with its pointer at zero or any other minute-line and serving also to measure accurately and indicate with certainty the extent of any movement from one of these points to any other. At the end the minutes-screw has a milled head for manipulation. The level-screw $m$, passing through one side of the hub $b$ into a hole in the axis of the telescope, fastens the said degree-plate and arc to the telescope, so that both must move together when either moves, and the position and movement of the telescope will be shown by the lines on the arc and dial with their pointers. On opposite sides of the telescopic axis where it passes through said hub are holes, into which said level-screw $m$ enters, thus fastening rigidly the degree-plate and arc to the telescope, so that both must move together and so that the position and the extent of any movement of the telescope may be read in degrees from the arc and in minutes from the dial. These holes are carefully so placed that when the instrument or circular plate carrying the telescope is level and the level-screw inserted in one of the holes of the axis and the arc is fastened by the degree-catch with its pointer at zero on the arc the telescope is necessarily level, so that all the operator need do to level the telescope and know that it is so is to thus fix those parts and then level the instrument in the ordinary way. This may be tested in the usual way by sighting some distant object, then half rotate the upper circular plate, remove the level-screw, reverse the telescope, and insert the screw in the opposite hole, and again sight the same object. The instrument then serves also as a level.

This completes the description of my device so far as it relates to leveling or measuring and indicating vertical angles in whole degrees and minutes. That portion making the measurement and indication to seconds is described as follows, namely: Near the end opposite its milled head or at any other suitable place the shaft of the said minutes-screw passes rotatably through the hub of the sector $n$. The clamp-screw $o$ passes through one side of this hub with its end against said shaft and serves when tightened to fasten said sector to said shaft, so that the shaft must turn when the sector turns, and when loosened this shaft may turn while the sector remains stationary. The periphery of this sector is cut in threads with one-minute pitch and form part of a seconds-screw gear $p$ for rotating the minutes-screw. Passing horizontally and at a right angle through a downward projection at the end of the horizontal bar 2 and opposite to said sector and so as to be immediately under and in contact with its periphery when downward is the seconds-screw $r$. A portion of its end under said sector is cut in threads corresponding with and to always engage those in the periphery of the sector and constituting therewith the seconds-screw gear $p$ for rotating said minutes-screw by turning this seconds-screw. These threads are of such pitch—minute pitch—that when engaged one revolution of the seconds-screw will turn the minutes-screw just one-sixtieth of a revolution, or one minute. Near its other or outer end the shaft of this seconds-screw passes rigidly through a dial $s$, graduated like the aforesaid minutes-dial with sixty lines for seconds and which as the dial revolves are moved past a stationary pointer for identification. The periphery of this dial or of the casing containing it is cut with sixty equidistant triangular grooves, also for seconds. The seconds-dial catch $t$ is so shaped and adjusted that its movable shaped end may at will be made to enter and fill any one of said grooves in the periphery of said dial and serves to fix the dial with its pointer at zero or any other seconds-line as a starting-point for measurement and to make it certain that the dial is exactly in that position and that any movement from one groove to another has been by exactly whole seconds, without trusting to the eye to determine when or whether the pointer is exactly on a line or how far it is from one. This catch is so shaped and arranged as to serve also as a pointer past which the lines of the dial are moved for identification. At the end outside of the dial this seconds-screw has a milled head for manipulation.

It will be seen that with this device the engineer's transit is converted into also an accurate level and one more readily adjusted than the ordinary level and is made to serve also all ordinary purposes of a theodolite in measuring and indicating vertical angles, while not interfering with its use for its ordinary purposes. By withdrawing the level-screw from the axis the instrument may be used without reference to this device. It will be further seen that the vertical position of any object as above or below the level and the value of any vertical angle may be thus determined, indicated, and read in degrees, minutes, and seconds with absolute accuracy and certainty and with no liability to mistake and that any line may be thus laid off at any angle of elevation or depression, and the angle of elevation or depression of any line may be thus determined and read with the same accuracy and certainty, and, further, that the measurements and indications of this device are mechanical and with absolute mechanical accuracy and certainty and are not liable to the mistakes and uncertainties incident to the present mode of judging by the eye. The pointers of the dials are used only to show which line is meant and not at all to show when the pointer coincides with a line or how far it is from one. All this is here determined mechanically and with the accuracy and certainty belonging to that mode, and this device not only serves all the purposes of the ordinary tangent-screw and other methods for making micrometer movements of the telescope, but also accurately measures and indicates the extent of such movements.

The normal position of the parts of the device when ready for work is this: The level-screw withdrawn from the axis, the arc fastened with its pointer at zero, each dial fastened by its catch with its pointer at "60" or zero, the dial-screw in the sleeve and the set-screw in one of the bearings and the sector-screw loosened, so as to permit the movement of the parts, and the first-mentioned screw-gear disengaged by the eccentric.

Some of the workings of this device are as follows, namely:

First. Required the angle between two objects, one above and one below the level. Having leveled the instrument in the usual way, insert the level-screw in the axis, thus fastening the degree-plate to the telescope. Then with the degree-catch fix the arc with its pointer at zero. The telescope is now level if the instrument was properly leveled. Disengage the degree-catch and move the telescope so that it sights, say, the lower object. Unless this movement has been one of exactly whole degrees the degree-catch will not now enter one of the grooves in the arc. Then with the eccentric engage the minutes-screw gear and with the minutes-screw move the telescope up until the degree-catch enters and fills a groove. The movement has now been by exactly whole degrees, and the arc and pointer will tell their number; but the glass does not quite sight the first object. Fasten the dial-screw so that the dial must turn with the minutes-screw and with that screw move the glass to the object. Now if the minutes-pointer is between two lines it shows that there are also seconds to be considered, and the dial-catch will not enter one of its grooves. Then turn the telescope back a trifle until the dial-catch does thus enter. The movement has now been by exactly whole degrees and whole minutes; but the glass does not yet quite sight the object. Tighten the sector-screw so as to fasten the sector to its shaft and disengage the seconds-dial catch, so as to permit that dial to turn. Then with the seconds-screw move the glass till it sights the object and read the whole degrees of the movement from the arc, the whole minutes from the minutes-dial, and the seconds from that dial. Read in this way the angle from a level is, we will say, 14° 24' 16". This is the angle of depression from the level. Then disengage the catches and the screw-gear, replace the dials with their pointers at "60" or zero, loosen the dial-screw and sector-screw, and move the glass to the second object and proceed as before. This angle of elevation is, we will say, 13° 16' 20", to which add the former angle, making 27° 40' 36", which is the exact angle.

Second. To lay off or establish a line or grade at a required elevation—say of 10° 20' 30"—using here the screw-gear instead of the arc to measure whole degrees also and using the arc to count or number them. With the parts of the device in their normal positions as above described and the instruments leveled, the level-screw inserted in the axis, then with the eccentric engage the screw-gear and with the minutes-screw move the arc until its pointer enters the zero-groove. The telescope is now level. With the clamp-screw $o$ in the sector $n$ fix rigidly the minutes-screw in its then position. Disengage the screw-gear and the degree-catch from its groove and move the telescope up the required whole degrees, as shown on the arc. Engage the screw-gear. As those threads will not mesh or engage unless the movement has been by exactly whole degrees, their engagement will both force the arc into that position and make it certain that it is so. Now tighten the dial-catch, loosen the clamp-screw, and turn the minutes-screw the required minutes, as indicated on the dial, and engage the dial-catch to make it certain that this movement has been one of exactly whole minutes. Then tighten the sector-screw and with the seconds-screw move the glass the required seconds, as shown on the seconds-dial, and the glass points as desired.

Having thus described my invention, what I claim, and desire to secure by Letters Patent, is—

1. In a surveying instrument, the combination with a rotatable member thereof, of means for determining the amount of angular movement of said member comprising a degree-sector movable with the rotatable member and about the same axis and having degree-notches on its peripheral edge, a screw-threaded sector carried by the degree-sector, locking means mounted adjacent the degree-sector and coöperating with the notches thereof, and means mounted adjacent the screw-threaded sector and comprising a member adapted to coöperate therewith to determine the micrometric movements thereof, said micrometer means being movable into coöperative relation to the screw-threaded member.

2. In a surveying instrument, the combination with the telescope, its supporting shaft and standards carrying bearings therefor, of a vertical degree-plate mounted on the shaft and having degree-notches thereon, a screw-threaded sector carried by the degree-plate, means mounted below the degree-plate and movable into coöperative relation to the degree-notches to lock the degree-plate at whole-degree angles, micrometer means, comprising a screw, mounted below the degree-plate and movable into coöperative relation to the screw-threaded sector for determining and indicating in fractions of degrees the movements of the sector beyond whole degrees, and means for moving the last-named means into and out of coöperative relation to the screw-threaded sector.

3. In a surveying instrument, the combination with a telescope its supporting shaft and standards carrying bearings therefor, of a vertical degree-plate provided with degree-notches and having a hub journaled on the telescope-shaft, means for fixing the hub to the shaft, a pivoted pointer positioned to indicate in degrees the angular movement of the degree-plate, the said pointer having a portion adapted to engage the degree-notches of the degree-plate to secure it in a position at zero or in any position after an angular movement of whole degrees, a screw-threaded sector on the degree-plate, a minutes-screw, means for moving the minutes-screw into and out of engagement with the screw-threaded sector, detachable means on the minutes-screw for indicating in minutes the movement of the degree-plate beyond whole degrees, and means detachably connected with the minutes-screw for indicating in seconds the movement of the degree-plate beyond whole minutes, substantially as described.

4. In a surveying instrument, the combination with a telescope, its supporting shaft and standards carrying bearings therefor, of a vertical degree-plate provided with degree-notches and degree-indications therefor and rotatably mounted upon the telescope-shaft, means coöperating with the shaft for clamping the degree-plate in two predetermined positions with reference to the optical axis of the telescope, said positions being one hundred and eighty degrees apart and so located that the optical axis of the telescope is horizontal when the zero graduation of the connected degree-plate lies in the vertical line through the axis of the telescope-shaft, means coöperating with the notches of the degree-plate for locking the plate and connected telescope at different whole-degree angles of inclination, said means carrying an indicating-pointer, means, comprising a screw-threaded sector carried by the degree-plate and a coöperating screw, for moving said plate through determinable whole-minute angles, means for locking the moving means at such whole-minute angles, and means for moving the screw into and out of engagement with the screw-threaded sector.

5. In a surveying instrument, the combination with a telescope, its supporting shaft and standards carrying bearings therefor, of a graduated vertical degree-plate mounted upon the shaft and provided with means for clamping it rigidly thereto, and micrometer means for effecting and indicating the micrometric movements of the telescope, comprising a screw-threaded sector carried by the degree-plate, a frame pivoted to one of the telescope-standards and a screw carried thereby, means to move the frame to cause the screw to engage with or be disengaged from the screw-threaded sector, the pitch of the screw-threads corresponding to a movement of one degree of the degree-plate, means for locking the screw in fractional parts of its revolution, said means being provided with minute-graduations and an indicating-pointer, and means also mounted upon the pivoted frame and connectible to the screw for effecting rotation thereof corresponding to seconds of rotative movement of the vertical degree-plate.

6. In a surveying instrument, the combination with a telescope, its supporting shaft and standards carrying bearings therefor, of a vertical degree-plate provided with degree-notches and mounted upon the telescope-shaft, means coöperating with the shaft for clamping the degree-plate in certain predetermined positions with reference to the optical axis of the telescope, means coöperating with the notches of the degree-plate for locking the plate and connected telescope at different whole-degree angles of inclination, said means carrying an indicating-pointer, means for moving said plate through determinable whole-minute angles and means for locking the moving means at such whole-minute angles, additional means for determining whole-second angles of inclination and means for connecting said seconds means to said minutes means whereby the movement of the seconds means may be transmitted to the vertical plate, and means for locking the seconds means at whole-second angles.

7. In a surveying instrument, the combination with a telescope, its supporting shaft and standards carrying bearings therefor, of a vertical graduated, sector-shaped degree-plate having a hub rotatably mounted on said shaft, means mounted adjacent the peripheral edge of the degree-plate and having an indicator for the graduations and a portion coöperating with the degree-plate for positioning and fixing said plate with said indicator on any degree-line of said plate, a lateral screw-threaded member carried by and parallel with said degree-plate, a minutes-screw tangent to said member and engaging the threads thereof, said threads being of degree pitch, means for supporting said screw in such position, means for indicating in minutes the fractional parts of the rotation of the minutes-screw beyond whole degrees and for fixing the screw at such whole-minute angles, means for indicating in seconds the fractional parts of the rotation of said minutes-screw beyond whole minutes and for fixing the screw at such whole-second angles, said recited means operating in succession to determine finally the vertical position of the telescope in degrees, minutes and seconds, said seconds means being disconnectible from said minutes means to permit the independent operation of the latter, and said minutes means being disconnectible from the degree-indicating means to permit the independent operation of said degree means, and means coöperating with the telescope-shaft for fixing the hub of the degree-plate thereto so that the inclination of the optical axis of the telescope may be determined directly from the degree plate and indicator.

In witness whereof I hereunto set my hand this 25th day of February, 1905.

FRANCIS E. HUTCHINS.

Witnesses:
EDWARD C. WILSON,
H. L. PITTMAN.